(12) United States Patent
Probst et al.

(10) Patent No.: US 7,778,748 B2
(45) Date of Patent: Aug. 17, 2010

(54) SYSTEM AND METHOD FOR TESTING A VEHICLE SUSPENSION

(75) Inventors: John Probst, Sherrills Ford, NC (US); Terry Satchell, Hendersonville, NC (US)

(73) Assignee: Ford Motor Company, Dearborn, MI (US)

( * ) Notice: Subject to any disclaimer, the term of this patent is extended or adjusted under 35 U.S.C. 154(b) by 940 days.

(21) Appl. No.: 11/561,519

(22) Filed: Nov. 20, 2006

(65) Prior Publication Data

US 2007/0118258 A1 May 24, 2007

Related U.S. Application Data

(60) Provisional application No. 60/738,232, filed on Nov. 18, 2005.

(51) Int. Cl.
*G01M 17/00* (2006.01)
(52) U.S. Cl. .............................. 701/29; 701/33; 701/35; 701/36; 73/117.03
(58) Field of Classification Search .................. 701/29, 701/33, 35, 36, 73; 73/117.03, 116.01, 798; 280/5.5
See application file for complete search history.

(56) References Cited

U.S. PATENT DOCUMENTS

| 5,111,685 | A | 5/1992 | Langer |
| 5,487,301 | A | 1/1996 | Muller et al. |
| 5,942,673 | A | 8/1999 | Horiuchi et al. |
| 6,327,526 | B1 | 12/2001 | Hagan |
| 7,054,727 | B2 | 5/2006 | Kemp et al. |
| 7,058,488 | B2 | 6/2006 | Kemp et al. |
| 7,440,844 | B2 * | 10/2008 | Barta et al. .................. 701/124 |
| 2007/0021886 | A1 * | 1/2007 | Miyajima ..................... 701/37 |

OTHER PUBLICATIONS

"Testing Systems for the Automotive Industry", <http://www.soverign-publications.com/abd-uk.htm>.

* cited by examiner

*Primary Examiner*—Gertrude Arthur Jeanglaud
(74) *Attorney, Agent, or Firm*—Jennifer M. Stec; Brooks Kushman P.C.

(57) ABSTRACT

A systems and method for testing a vehicle suspension may include a kinematics rig and a main control unit having a graphical user interface (GUI). The system can provide for automated testing, control, data acquisition and analysis, and sensor handling for conducting comprehensive performance testing of vehicle chassis and suspension systems in a contained solution. All requisite tests for suspension systems analysis may be user-selectable and configurable from the GUI and executed via software based on test procedures stored in memory. The system's data acquisition capabilities may be easily integrated into standard industry analysis tools.

20 Claims, 10 Drawing Sheets

SYSTEM AND METHOD FOR TESTING A VEHICLE SUSPENSION

CROSS-REFERENCE TO RELATED APPLICATIONS

This application claims the benefit of U.S. Provisional Application Ser. No. 60/738,232 filed Nov. 18, 2005.

BACKGROUND OF THE INVENTION

1. Field of the Invention

One embodiment of the present invention relates to a system and method for testing a vehicle suspension.

2. Background Art

Overall vehicle performance can be influenced by several factors. Typical factors may include characteristics of the engine, drivetrain, chassis, vehicle durability, and ride and handling. Ride and handling, in particular, may be greatly impacted by the vehicle's suspension. A suspension typically includes a system of springs, shock absorbers and linkages that connects a vehicle to its wheels. To this end, testing the suspension of a vehicle can provide essential information regarding the ride and handling of a vehicle. Testing a vehicle's suspension can also aid in predicting the suspension's performance. For example, analyzing the way a vehicle's suspension responds to certain test scenarios can help determine if any modifications to the suspension are necessary and, perhaps, identify suitable suspension adjustments. Further, suspension testing can provide a log or database of suspension information and characteristics that also helps in future suspension design.

In the automotive racing industry, a finely tuned racing suspension can improve the ability of the driver to control the vehicle. Because of the high speeds racecars travel, steering control is critically important, but it is also quite volatile. Vehicle conditions as well as race track conditions that can change throughout a race. For example, some conditions that can change throughout a race might include tire pressure, vehicle weight, track temperature, ambient temperature or other weather conditions. Even the slightest change in the condition of the vehicle or track can significantly alter the ride and handling, and thus, the steering control of the racecar. Accordingly, race teams may invest a lot of time and expense in testing the performance of a vehicle's suspension. The more these race teams know how their vehicle's react or handle on certain tracks under certain conditions, the better equipped they may be to tune a suspension before or during a race.

Current kinematic testing facilities can be prohibitively expensive to use on a large scale for vehicle suspension system testing and analysis, particularly on vehicles in the racing industry. Contributing to this expense is the lack of any contained solution capable of handling the numerous requirements of suspension testing on a large scale. Typically, in the racing industry, for instance, special arrangement may be made to prepare separate test system components for use in testing a vehicle's suspension. Presently, it is common for a race team to have a testing facility prepare individualized test set-up controls, separate data logging devices, and other equipment to aid in the conversion and manipulation of accumulated data. Thus, there lacks any synergistic solution to testing vehicle suspensions on a large scale that can simplify the testing process and reduce long-term costs.

In light of the foregoing, there is a need for a suspension testing computer system that addresses one or more of the disadvantages identified above. What is also needed is a method testing a vehicle suspension that addresses one or more of the disadvantages identified above.

SUMMARY OF THE INVENTION

According to one embodiment of the present invention, a computer system for testing a vehicle suspension using a kinematics rig having one or more rig feedback sensors is disclosed. The computer system includes a central processing unit (CPU) for executing machine instructions; a memory for storing machine instructions that are to be executed by the CPU; and a rig control circuit in electrical communication with the CPU for operating the kinematics rig and the one or more rig feedback sensors. The machine instructions when executed by the CPU implement the following functions: receiving an input corresponding to a pre-programmed test procedure for testing the vehicle suspension; transmitting a control signal to the kinematics rig corresponding to the test procedure; receiving suspension data sensed by one or more vehicle suspension sensors during execution of the test procedure; receiving rig data sensed by the one or more rig feedback sensors during execution of the test procedure; and formatting the suspension data and rig data for display via a graphical user interface (GUI).

According to another embodiment of the present invention, a computer system for testing a vehicle suspension using a kinematics rig having one or more rams for supporting the vehicle at its wheels and having one or more rig feedback sensors is disclosed. The computer system includes a central processing unit (CPU) for executing machine instructions; a memory for storing machine instructions that are to be executed by the CPU; and a rig control circuit in electrical communication with the CPU for operating the kinematics rig. The machine instructions when executed by the CPU implement the following functions: displaying a graphical user interface including one or more input fields, wherein the input fields correspond to at least one of a pre-programmed test procedure, starting position of the one or more rams, and displacement of the one or more rams; receiving an input corresponding to the at least one of the pre-programmed test procedure, starting position of the one or more rams, and displacement of the one or more rams for testing the vehicle suspension; transmitting a control signal to the kinematics rig corresponding to the at least one of the pre-programmed test procedure, starting position of the one or more rams, and displacement of the one or more rams; receiving suspension data sensed by one or more vehicle suspension sensors during execution of the test procedure; receiving rig data sensed by the one or more rig feedback sensors during execution of the test procedure; and formatting the suspension data and rig data for simultaneous display via a graphical user interface (GUI).

According to yet another embodiment of the present invention a method for testing a vehicle suspension using a kinematics rig is disclosed. The method includes receiving an input corresponding to a pre-programmed test procedure for testing the vehicle suspension; transmitting a control signal to the kinematics rig corresponding to the test procedure; receiving suspension data sensed by one or more vehicle suspension sensors during execution of the test procedure; receiving rig data sensed by one or more rig feedback sensors during execution of the test procedure; and formatting the suspension data and rig data for display via a graphical user interface (GUI).

BRIEF DESCRIPTION OF THE DRAWINGS

FIG. 5 shows a sensor calibration menu GUI according to one embodiment of the present invention;

FIG. 6 shows a failure mode menu GUI according to one embodiment of the present invention;

DETAILED DESCRIPTION OF THE PREFERRED EMBODIMENT(S)

Figure 1:
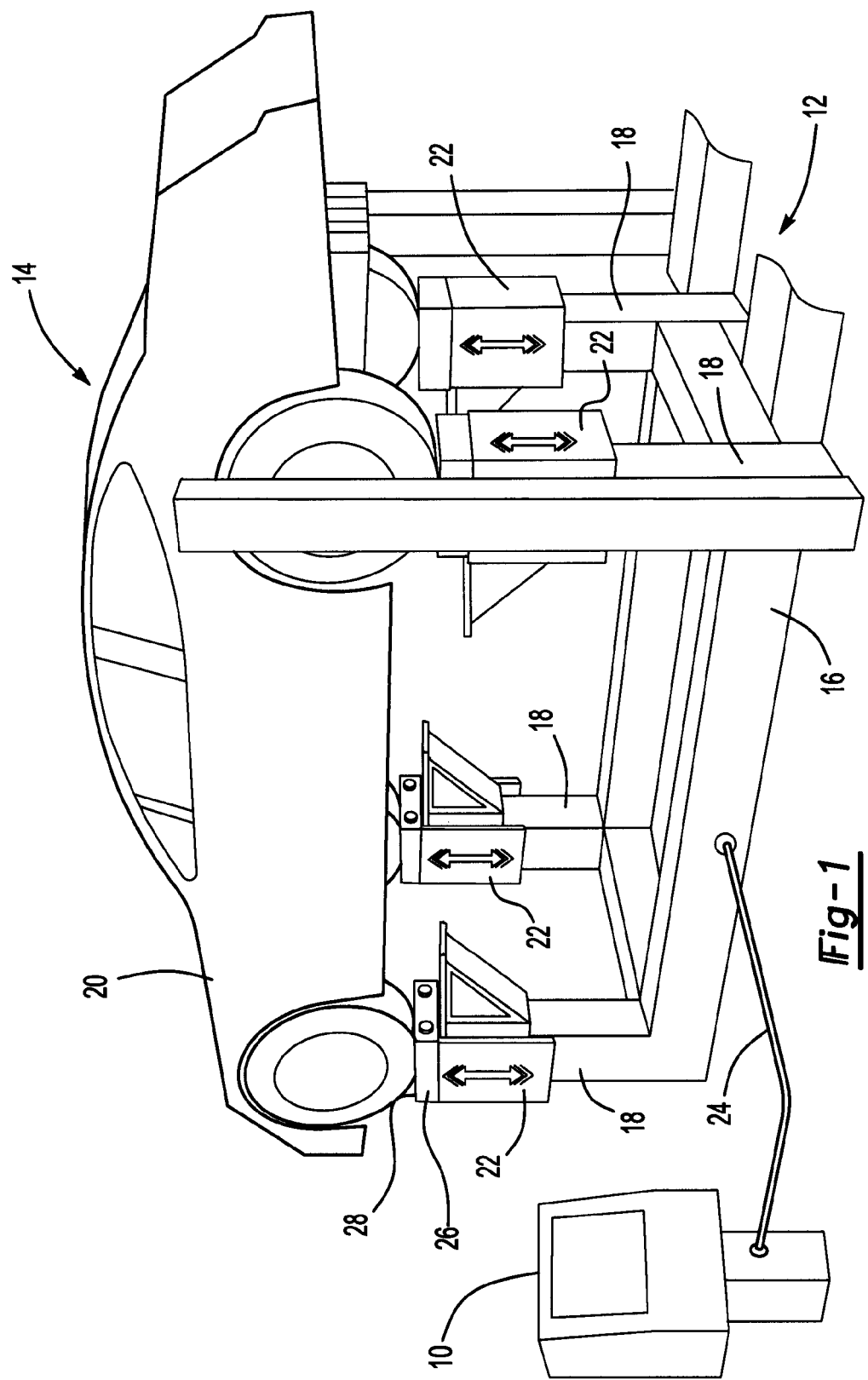
FIG. 1 shows an environmental view of a vehicle suspension test system according to one embodiment of the present invention.

FIG. 1 shows a computer system 10 and a kinematics rig 12 of a vehicle suspension test system 14 according to one embodiment of the present invention. The computer system 10 provides the interface between the kinematics rig 12 and an operator, e.g., a test engineer. As depicted in FIG. 1, the kinematics rig 12 is a full vehicle kinematics rig, although other kinematics rigs can be used in accordance with this invention. The kinematics rig 12 can be manufactured in various ways as is known in the art and mainly consists of a rigid base 16 for supporting four vertical posts 18, which in turn support the four wheels of a loaded test vehicle 20.

Each vertical post 18 of the kinematics rig 12 can be equipped with an independently controlled ram 22 that can be displaced linearly permitting vertical deflection of the vehicle's wheel. The rams 22 can be actuated by any means known in the art, for example, by hydraulic control, pneumatic control, or the like, without departing from the scope of the present invention. For instance, in the event that the kinematics rig 12 is hydraulically controlled, then the kinematics rig 12 may also contain hydraulic pumps (not shown). Control of the hydraulic pumps can effectuate displacement of each of the rams 22 according to instructions provided within the computer system 10. Accordingly, the vehicle suspension test system 14 can allow for individual control of the rams 22 through communication with the computer system 10. To this end, the computer system 10 and kinematics rig 12 are in electrical communication with each other via system wiring 24.

In at least one embodiment, the top of each ram 22 may contain a scale 26 upon which a tire of the vehicle 20 rests. Each tire of a loaded test vehicle 20 can make contact with a flat, horizontal surface referred to as a scale pad 28. The scales 26 may permit the system to measure the four corner weights of the vehicle 20, as well as the total weight, the right side weight, the left side weight, the front weight, and the rear weight. From the weight measurements, the system can calculate the percent front load and the percent wedge.

To assist with loading a test vehicle 20 onto the four vertical posts 18, the kinematics rig 12 may include a lift (not shown) and a pair of removable transverse beams (not shown). A vehicle can be loaded onto the lift at ground level. Once the vehicle is in position on the lift, the lift can be vertically raised to a height corresponding to the top of the vertical posts 18. Typically, the rams 22 can be found at their "zero" position for the purposes of loading and unloading vehicles. The lift can be raised and lowered by any means known in the art. For example, the lift may include a jack (not shown). The jack can be integrated with the lift or separate therefrom. As another example, the lift may be hydraulically controlled. The removable transverse beams can be utilized solely for loading and unloading vehicles. The first removable transverse beam can be placed between the left front vertical post and the left rear vertical post and supported such that the vehicle's left front wheel can traverse the beam until it comes to rest on the scale pad 28 of the left front vertical post.

Likewise, the second removable transverse beam can be placed between the right front vertical post and the right rear vertical post and supported such that the vehicle's right front wheel can traverse the beam until it comes to rest on the scale pad 28 of the right front vertical post. Once all four wheels are in position atop their corresponding vertical posts 18, the removable transverse beams can be removed.

Additionally, the lift can be lowered or altogether removed so as not to interfere with testing. Once the vehicle 20 is mounted on the four vertical posts 18, it can be secured to an unmovable mass, such as the base 16 of the kinematics rig 12 or some other suitable mass for restraining the sprung mass. Accordingly, the kinematics rig 12 may include restraints (not shown) that connect to the vehicle body. In one embodiment, the restraints can be multiple strut mechanisms that attach to the base 16 of the kinematics rig 12 and to the frame rails of the vehicle 20 at the four corners. The restraints secure the sprung mass from moving in all three directional axes during testing.

Figure 2:
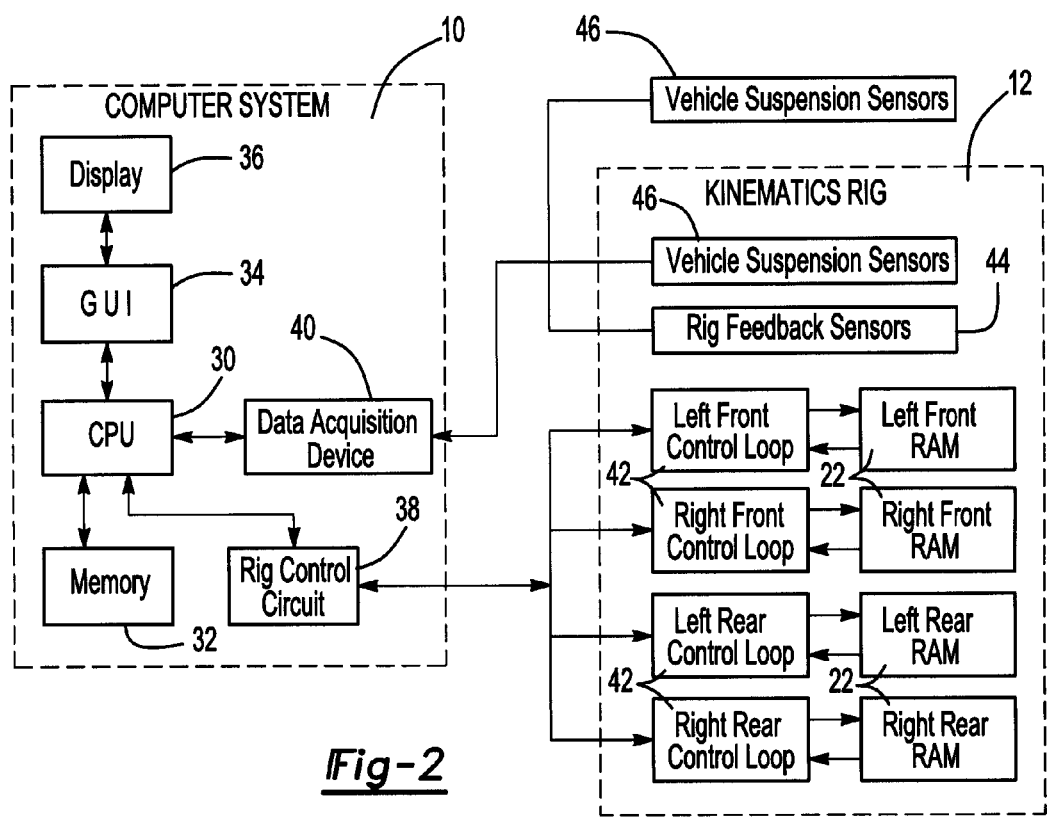
FIG. 2 shows a block diagram of the vehicle suspension test system of FIG. 1 according to one embodiment of the present invention.

FIG. 2 shows a block diagram of the vehicle suspension test system 14 of FIG. 1 according to one embodiment of the present invention. As shown in FIG. 2, the computer system 10 includes a central processing unit (CPU) 30 for executing machine instructions, a memory 32 for storing machine instructions, one or more graphical user interfaces (GUIs) 34, a display 36, a rig control circuit 38 and a data acquisition device 40. In at least one embodiment, the components of the computer system 10 can be contained within a single unit, i.e., a single housing or cabinet.

Also depicted in FIG. 2 is the kinematics rig 12, which includes the rams 22. Each ram 22 can be electro-mechanically coupled to a displacement control loop 42, which in turn can be electrically coupled to the rig control circuit 38. The rig control circuit 38 may include a suitable analog or digital microcontroller for communicating with the CPU 30 and the displacement control loops 42 to effectuate displacement of the rams 22. The displacement control loops 42 can be, for example, proportional-integral-derivative (PID) controlled. However, it is fully contemplated that other types of control loops, e.g., proportional-integral (PI), proportional (P), and proportional-derivative (PD), may be implemented to control the desired displacement of the rams 22 without departing from the scope of the present invention. The computer system 10 can provide the signal generation for each of the rams 22.

In this regard, the CPU 30 may execute various machine instructions which signal the rig control circuit 38 to operate the rams 22 accordingly.

Various test procedures and scenarios can be programmed into the computer system software and accessible for implementation by the operator through the one or more GUIs 34. Moreover, various control loops can be selectively chosen by the operator to be active during a given test procedure. Non-limiting examples of the various control loops that may be employed include: right front only, left front only, right rear only, left rear only, front axle heave, front axle roll, rear axle heave, rear axle roll, full vehicle heave, full vehicle roll, and full vehicle warp.

According to one embodiment of the present invention, the rig control circuit 38 may include an analog controller for controlling the displacement control loops 42. In this configuration, turn potentiometers can be used to control gains in the test system 14. The turn potentiometers can be conveniently accessible to a system operator.

According to another embodiment of the present invention, the rig control circuit 38 may include a digital controller for controlling the displacement control loops 42. In this configuration, the gain values can be entered by the operator via the one or more GUIs 34 at the computer system 10. The rate of the control loop can be any suitable rate for the particular digital controller implemented, so long as the rate remains constant so as to minimize the effect on the actual gains in the system. The system software can include a control mode to prevent an operator from changing the gains in the controller inadvertently. The software could require the operator to enter the control mode before the system would recognize any gain changes made at the software interface level.

Demands into the ram displacement control can generally have two forms, global and relative. Global demand signals, for example, can be generated to move the vehicle 20 from the installation (or loading) position to a selected starting height. As previously discussed, the vehicle 20 is typically loaded onto the kinematics rig 12 with the rams 22 at their full lowered position. The full lowered position can be referred to as the "zero" position. The selected starting height can be referred to as the "home" position and can be varied by the operator through the one or more GUIs 34. Relative demand signals, on the other hand, can be generated for suspension compression and rebound. The relative demands can be referenced from the global demand at each corner, i.e., they can be referenced from the "home" position. Global demand signals can be generated as they are entered by an operator through the software interface at the computer system 10. Relative demand signals, however, may only be generated after the operator has requested a particular test to begin running.

The kinematics rig 12 may contain several sensors for recording data corresponding to the operation of the kinematics rig itself or to that of a loaded vehicle. Each sensor output may have a dedicated input channel at the rdata acquisition device 40 of the computer system 10. Accordingly, the sensor measurements can be recorded and displayed by the computer system 10.

Particularly, the kinematics rig 12 may include one or more rig feedback sensors 44 for measuring various parameters of the kinematics rig itself. For example, in an embodiment where each ram is hydraulically controlled, the rig feedback sensors 44 may include a system pressure sensor. The system pressure sensor may be located in the main hydraulic supply line and can monitor the total pressure of the hydraulic system. It is also contemplated that the one or more rig feedback sensor 44 can include a separate pressure sensor provided at the hydraulic supply lines to each individual ram. If, for example, the total system pressure falls outside a predetermined limit as defined by the operator through the computer system 10, a failure mode may be activated to either warn the operator or perhaps shut down the operation of the kinematics rig 12 until the total system pressure is adequate or subdues.

Moreover, the one or more rig feedback sensor 44 may include a linear displacement transducer for sensing ram displacement. The linear displacement transducer may be in proximity to a vertical post 18 and can sense displacement of the rams 22. The linear displacement transducer may also provide positional feedback to the corresponding ram control loop thereby eliminating the need for continuous operator attention and ensuring that ram displacement corresponds to the parameters or test procedures as defined in the computer system 10. Alternatively, displacement of the ram 22 may be measured by a string potentiometer, linear potentiometer, or other sensing device as is commonly known in the art.

The one or more rig feedback sensor 44 may also include sensors necessary for determining failure modes or for enhancing safety. Such sensors can be a manual switch, hall effect switch, or the like. Further, such sensors may, for example, indicate whether particular restraint mechanisms are in place, whether ramps have been removed from the rig, or whether manual stops on the rams 22 have been released.

In addition to being equipped with sensors for monitoring the characteristics of the kinematics rig 12, the test system 14 is equipped with one or more vehicle suspension sensors 46 for recording data pertaining to the vehicle 20 under test, e.g., geometry, alignment, and suspension characteristics. As non-limiting examples, the one or more vehicle suspension sensor 46 can be a linear displacement transducer, a load transducer or a geometrical alignment transducer. The one or more vehicle suspension sensor 46 may be permanently affixed to the kinematics rig 12 or may require temporary attachment to a particular part of the vehicle 20. In either case, the one or more vehicle suspension sensor 46 employed to acquire data during each test can be readily accessible and incorporated into the system.

The one or more vehicle suspension sensors 46 can be duplicated at each wheel so that similar data points can be obtained for the right front, left front, right rear, and left rear wheels individually and collectively. For purposes of discussion, the one or more vehicle suspension sensors 46 will be described with reference to a single wheel. However, it is fully contemplated that similar vehicle suspension sensors can be implemented to record similar data at each of the other wheels. At a single wheel, the one or more vehicle suspension sensors 46 may include a damper (or shock) transducer for recording data pertaining to the suspension characteristics at that wheel, e.g., shock travel. Thus, the damper transducer may measure the relative displacement of the damper (shock) to facilitate replication of the attitude of the vehicle 20 much like it is measured on the race track. The data measured by the damper transducer can be relayed to the computer system 10 for recording, or displaying real-time values through a spare analog input channel, or both.

The damper transducer can be mounted much like it is when the vehicle 20 is on the track. That is, the damper transducer and an additional sensor can be fitted across both ends of the damper to measure its relative displacement. Alternatively or additionally, the test vehicle 20 can be fitted with modified dampers that include a string potentiometer mounted inside of a real damper and capable of determining the displacement of the piston inside the damper.

Further, the one or more vehicle suspension sensor 46 may include a displacement transducer or similar device for measuring wheel travel in addition to shock travel. This can facilitate calibration of the damper displacement sensors by displacing the wheel, which in turn displaces the damper.

Additionally, the one or more vehicle suspension sensor 46 can be a geometrical alignment transducer in proximity to each vertical post 18 to allow for the measurement of alignment parameters at each wheel. The data acquisition device 40 can be equipped with spare analog channels to accommodate these and other sensors to allow for expansion of testing parameters as advancements in technology and/or testing philosophy occur. One example of an alignment sensor may include a camber sensor for monitoring wheel camber. Another example of an alignment sensor may be a toe sensor for monitoring the amount of toe at each wheel. Yet another example of an alignment sensor may be a castor sensor for monitoring the castor angle.

Further, the one or more vehicle suspension sensor 46 may include a load transducer coupled to the scale 26 mounted at the top of the ram 22. The scale 26 can provide a flat, horizontal surface where the tire of a loaded vehicle comes to rest. Thus, the load transducer can measure the corner load of the vehicle 20 corresponding to the vertical post 18.

The data acquisition device 40 records measurements taken by the various sensors employed by the test system 14. The data acquisition device 40 may be implemented by a combination of hardware and software and can be part of the overall computer system 10. The data acquisition device 40 may typically include a communications controller capable of interfacing with serial or other communications protocols. Typical analog sensor outputs may be handled with analog to digital converters. The data acquisition device 40 contains a plurality of input channels corresponding to the inputs from the one or more rig feedback sensor 44, the one or more vehicle suspension sensor 46, or other additional sensors. The data measured at each channel can be recorded and displayed for real-time viewing at the computer system 10 through the one or more GUI 34. Additionally or alternatively, the data measured at each channel can be stored for later analysis.

All the channels can be recorded in a format that is easily imported into common plotting and analysis packages (e.g., Excel, PI Toolbox, or the like). For example, the computer system 10 may store the sensed suspension data into a flat file, then convert the flat file into a format readable by PI Toolbox. Once converted, the computer system 10 can easily import the converted file into PI Toolbox for further data analysis.

The data acquisition device 40 may be capable of twelve (12) bit analog-to-digital conversion. However, other bit levels may be contemplated as well.

Additionally, the data acquisition device 40 may be capable of allowing the system operator to select the data acquisition rate through the one or more GUIs 34. Suitable rates may fall in the range of 5 to 100 Hz, although other rates may be selected without departing from the scope of the present invention. Typically, data acquisition can be triggered at the request of the operator via the one or more GUIs 34. The data acquisition can trigger automatically when the operator begins running a particular test. Alternatively, the operator can manually trigger data acquisition of selected channels independent from the running of a particular test procedure through different modes available in the one or more GUIs 34.

The CPU 30 can execute machine instructions corresponding to signals received from the one or more GUIs 34. The signal generation, data acquisition, system calibration, and error checking functions of the computer system 10 can be implemented through a combination of hardware and software. Thus, the computer system 10 may be capable of: (1) operating the kinematics rig 12, including selective independent control of each of the four rams 22; (2) collecting data recorded by the various sensors; (3) selectively displaying channel inputs and outputs in real-time; (4) selectively displaying charts or graphs corresponding to suspension characteristics in real-time as a particular test is in progress; (5) calibrating the various sensors, hardware, software and test equipment; (6) detecting of failure modes; and (7) exporting data into ASCII or other file formats for importation into standard plotting packages or other analysis tools familiar to engineers, particularly in the racing industry, e.g., PI Toolbox, Excel, Matlab, or the like.

As previously mentioned, the computer system 10 may include one or more graphical user interfaces (GUIs) 34 that permit an operator to interact with the computer system 10. The one or more GUIs 34 employ graphical images and control elements in addition to text to represent the information and actions available to the operator. The graphical images and elements may be viewed by a user at the display 36. Typically, operator actions can be performed through direct manipulation of the graphical elements, i.e., via mouse, keyboard, touchscreen, or the like. The one or more GUIs 34 may be subdivided into one or more panels or areas containing the graphical elements employed therein. For instance, the one or more panels or areas of a GUI 34 may include one or more input fields, output fields, or labels. The input fields, for example, may include such elements as buttons, switches, text boxes, check boxes, or radial buttons, or the like.

Figure 3:
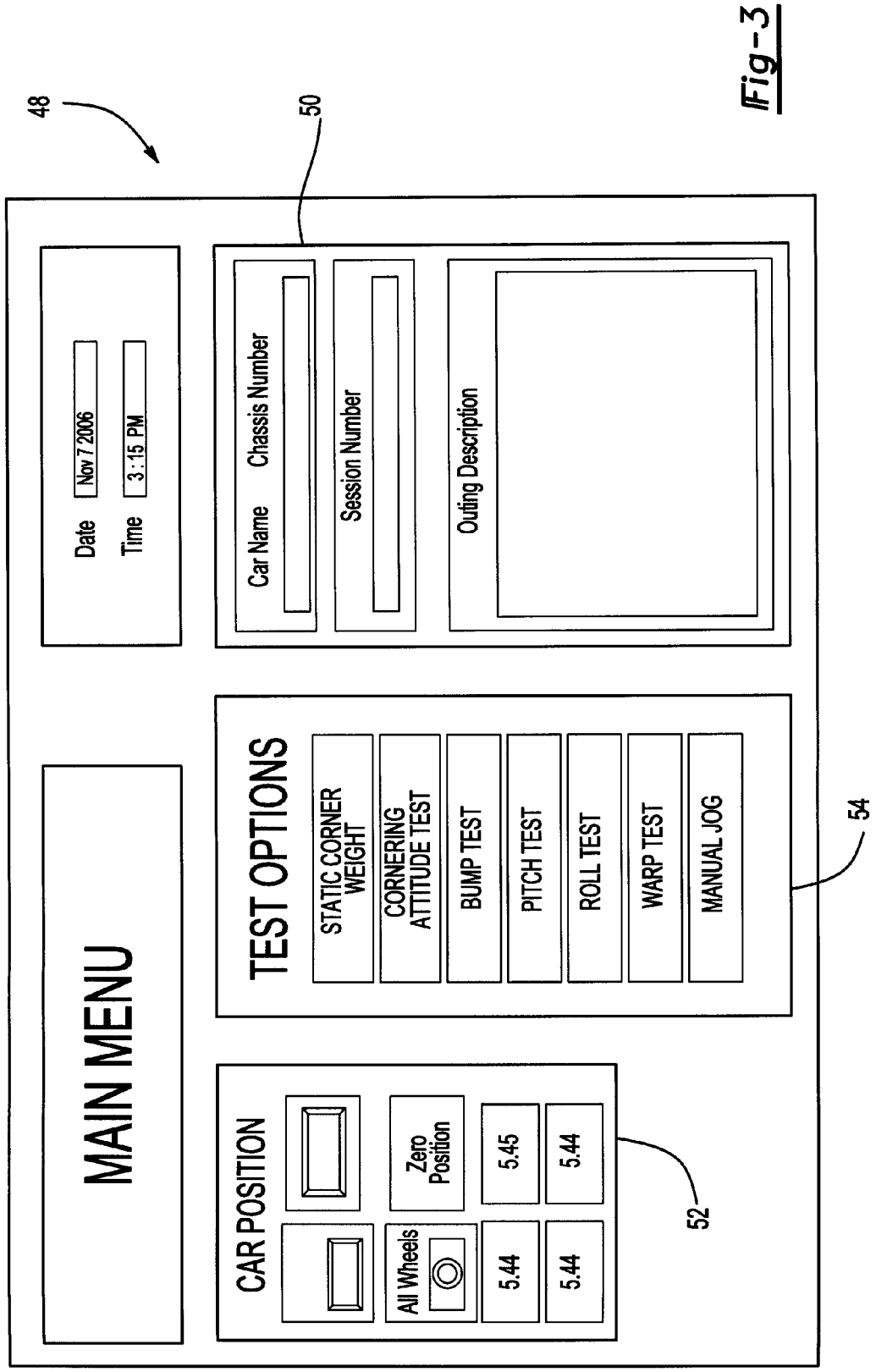
FIG. 3 shows a main menu graphical user interface (GUI) according to one embodiment of the present invention.

FIG. 3 depicts an exemplary GUI 48 of a main menu for display at the computer system 10. The main menu GUI 48 may include a test identification panel 50, a car position panel 52, and a test selection panel 54. The test identification panel 50 may include labels, input fields and output fields corresponding to information pertinent to identifying the test. Such information may include vehicle name, chassis identification, suspension configuration, session number, test particulars, and notes, among others. Such information may be written into a header of the data file created by the computer system 10 when data is recorded. The data files corresponding to a particular test, series of tests, or other test scenarios can be saved, retrieved, imported and exported by the computer system 10.

The car position panel 52 may include labels, input fields, and output fields for adjusting the "home" position of any or all rams 22. Additionally, the car position panel 52 may include input fields and labels for instructing one or more of the rams 22 to return to the "zero" position. As previously described, the "zero" position can refer to the rams 22 when they are in their fully lowered position. The selected starting height for a particular test can be referred to as the "home" position and can be varied by the operator through a GUI such as the main menu GUI 48.

The test selection panel 54 may include labels and input fields for selecting a pre-programmed test procedure. Manipulation of an input field corresponding to a particular pre-programmed test procedure may activate another GUI that enables the operator to customize the test procedure further, or simply commence testing. Alternatively, manipulation of an input field corresponding to a particular pre-programmed test procedure may cause the test to commence directly. As shown in FIG. 3, the main menu GUI 48 can provide a simple, user-selectable approach for choosing a pre-programmed test procedure for testing a vehicle suspension. Typical pre-programmed test procedures may include, as non-limiting examples, a static corner weight test, a cornering attitude test, a bump test, a pitch test, a roll test, a warp test, and a manual jog.

Figure 4:
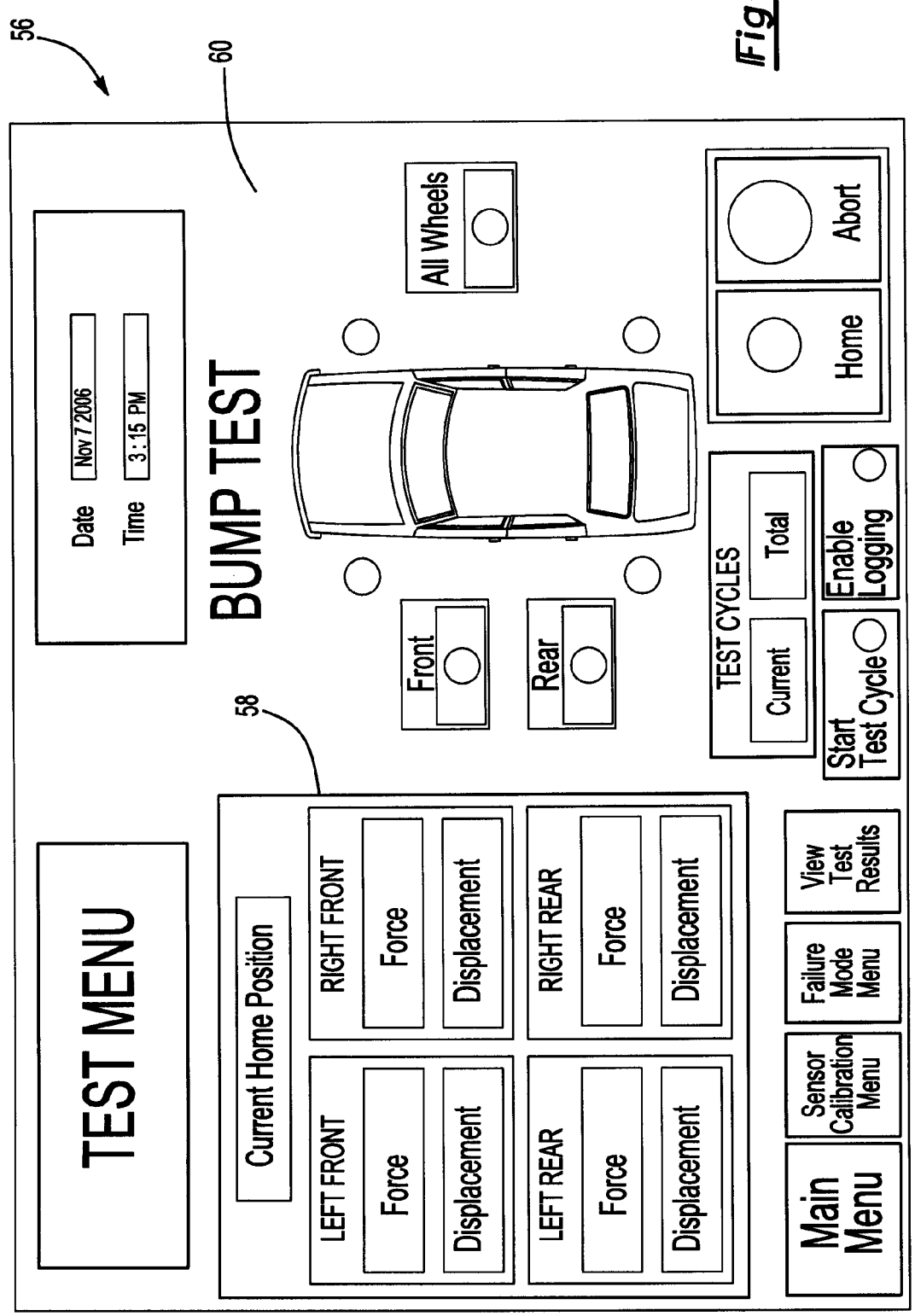
FIG. 4 shows a test menu GUI according to one embodiment of the present invention.

FIG. 4 depicts a GUI 56 for a typical test procedure. According to one embodiment of the present invention, selection of a pre-programmed test procedure from the main menu GUI 48 may cause the test menu GUI 56 corresponding to the selected test procedure to be displayed at the computer system 10. As shown in FIG. 4, the test menu GUI 56 corresponds to a bump test. However, it is fully contemplated that other test menu GUIs corresponding to other test procedures may be displayed at the computer system 10.

The test menu GUI 56 may include a wheel information panel 58 having labels and output fields for displaying the force and displacement at each vehicle wheel, as well as the current "home" position. The test menu GUI 56 may further include an area 60 having labels, input fields and output fields for permitting an operator to selectively choose which wheels to test. For instance, an operator may select the right front wheel only, left front wheel only, right rear wheel only, or the left rear wheel only for performing a single wheel bump test. Moreover, the operator may select the front wheels only or the rear wheels only for performing a single axle heave test, or all wheels for performing a full vehicle heave test.

Figure 5:
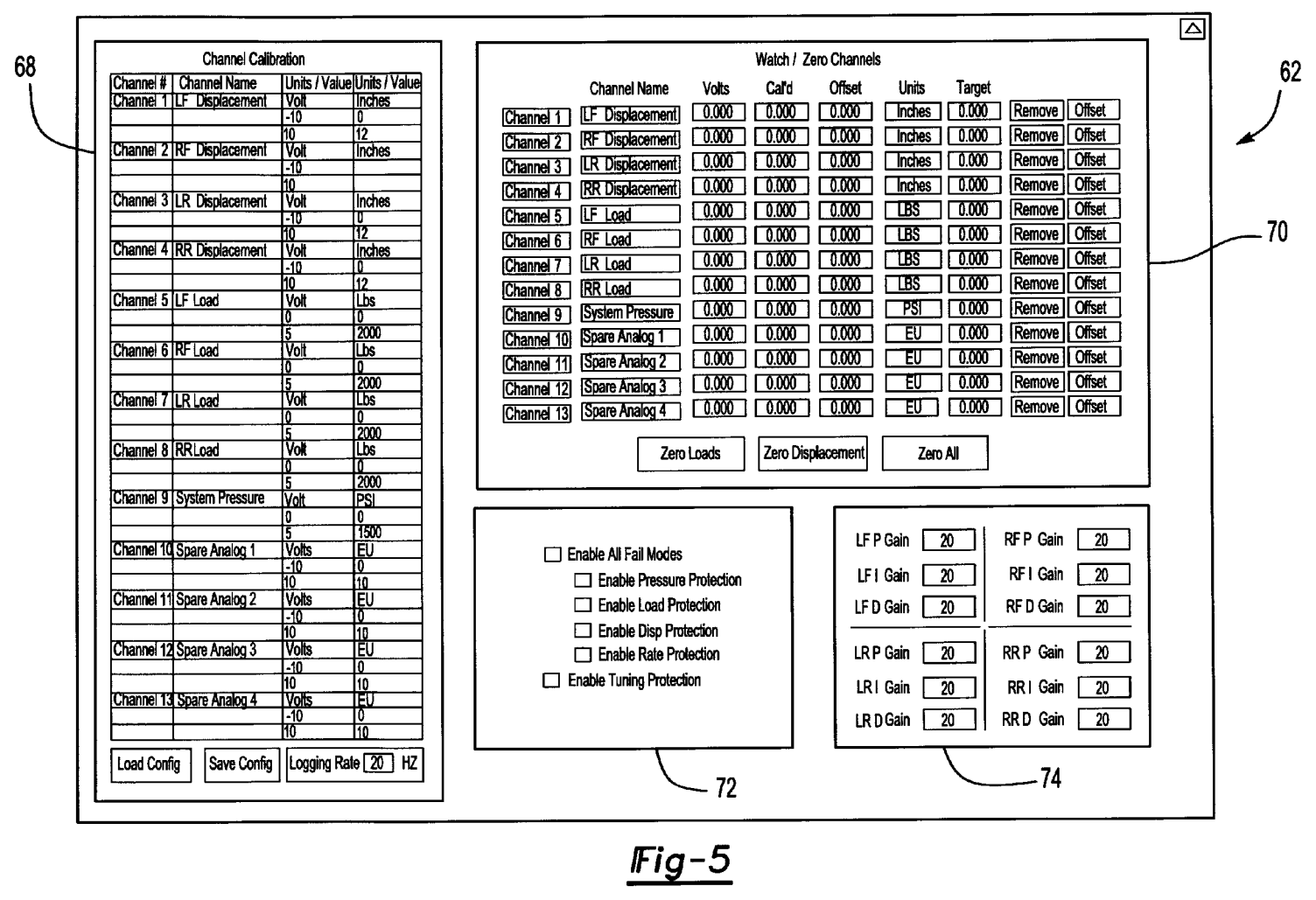
Figure 6:
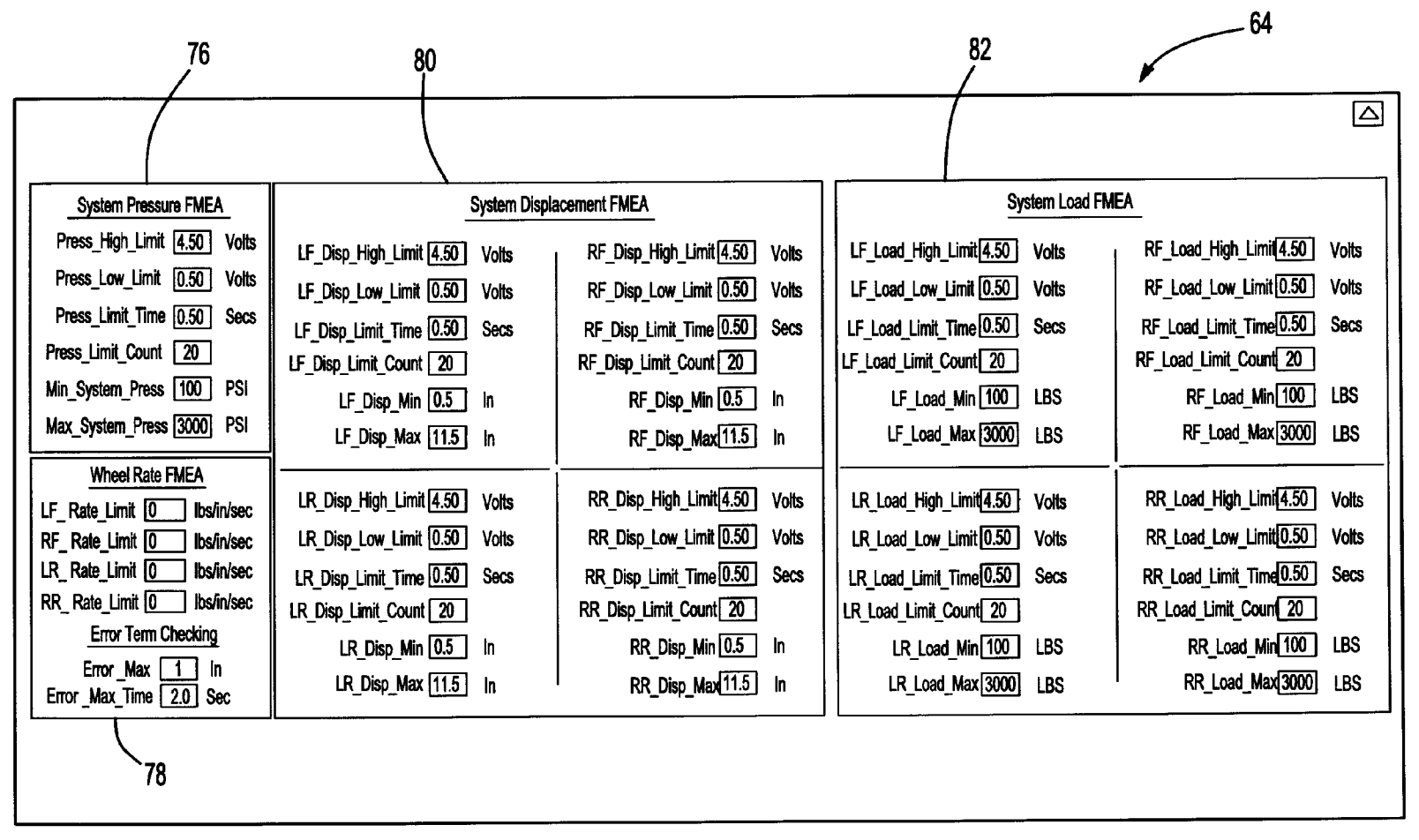
Figure 7:
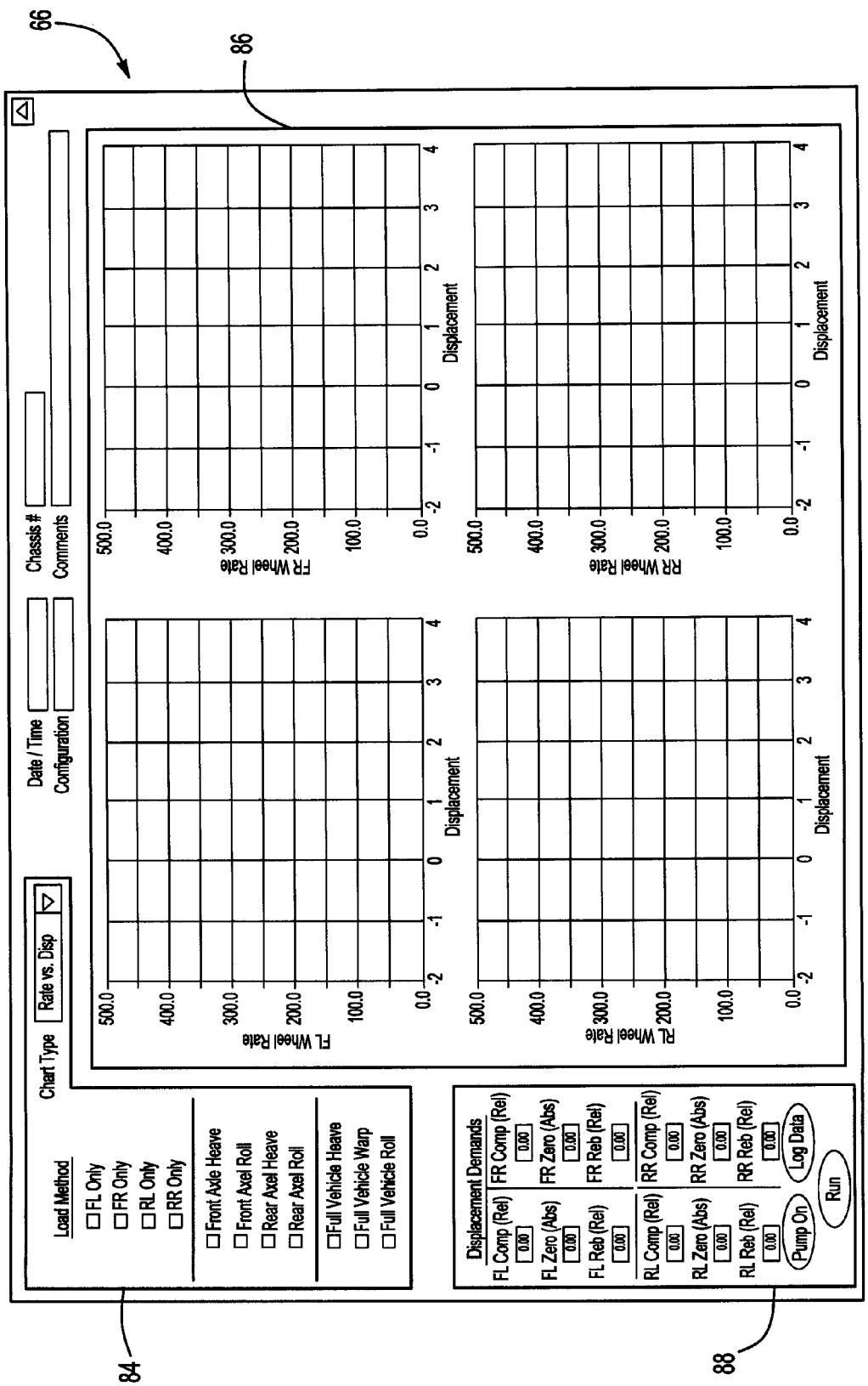
FIG. 7 shows a test results GUI according to one embodiment of the present invention.

Additionally, area 60 of the test menu GUI 56 may include labels, input fields and output fields corresponding to the total number of test cycles to be performed and the current test cycle of a test in progress. Further, area 60 of the test menu GUI 56 may include labels and input fields for adjusting the "home" position, returning to the main menu GUI 48, or for displaying a sensor calibration menu GUI 62 (as depicted in FIG. 5), a failure mode menu GUI 64 (as depicted in FIG. 6), or a test results GUI 66 (as depicted in FIG. 7). Moreover, area 60 of the test menu GUI 56 may include labels and input fields for instructing the data acquisition device 40 to begin logging data, instructing the computer system 10 to commence testing, or instructing the computer system 10 to abort a test in progress.

With reference now to FIG. 5, an exemplary GUI for sensor calibration is shown. The sensor calibration menu GUI 62 can provide the capability to separately calibrate, offset, and monitor each sensor and may include a channel calibration panel 68, a channel watch panel 70, a failure mode activation panel 72, and a control loop gain panel 74. The channel calibration panel 68 can include labels, input fields and output fields that permit an operator to create, save, and load calibration files. Moreover, the channel calibration panel 68 can include labels and input fields for selecting the data acquisition rate.

The channel watch panel 70 may include labels, input fields and output fields that provide the operator the ability to offset measurement input channels by a selected value to obtain desired levels and likewise remove the offset, if desired. It is fully contemplated that group offsets of channels can be applied or removed as well. For example, an operator can choose to globally offset all loads or all displacements, instead of individually offsetting these values at each wheel. Further, the channel watch panel 70 may permit an operator to watch the current values of all measurement input channels in either raw volts, calibrated units, or offset calibrated units.

The control loop gain panel 74 may include labels, input fields and output fields that permit an operator to adjust and monitor displacement control loop gains, assuming the rig control circuit 38 employs a digital controller for controlling the displacement control loops 42.

The failure mode activation panel 72 may include labels and input fields for selectively enabling the activation of various failure modes. For instance, an operator may select that all failure modes defined in the computer system 10 be enabled. Alternatively, an operator can choose particular failure modes to be active while others remain inactive. Several failure modes present in the computer system 10 may be defined. For example, the computer system 10 may monitor system parameters to ensure that the system components are working safely and satisfactorily. If implemented, various failure modes can be created in the computer system 10. The computer system 10 may monitor sensed values for any number of sensors employed by the computer system 10. Should a sensed value fall outside a specified threshold or fail to meet certain criteria, a failure mode may be generated.

FIG. 6 depicts an exemplary GUI 64 for a failure mode menu. The failure mode menu GUI 64 may include a system pressure panel 76, a wheel rate panel 78, a system displacement panel 80, and a system load panel 82, however, other panels are fully contemplated by the present invention. Panels 76, 78, 80, 82 may include labels and input fields that allow an operator to specify sensor limits or other criteria for generating a failure mode. In general, failure mode tracking may take place at all times to provide instantaneous notification of failure modes. Moreover, the computer system 10 may be capable of detecting both continuous and intermittent failure modes, in addition to other failure modes. Continuous failure modes can be triggered when a sensor's raw voltage output falls outside the specified limits for that particular sensor and remains outside the threshold continuously for a specified time. Intermittent failure modes can be triggered when a sensor's raw voltage falls outside the specified limits for that particular sensor for a specified number of occurrences within a specified time period.

If a failure is detected, the failure mode may be relayed to the operator through the computer system 10, or recorded into the data file corresponding to a test procedure that was being carried out when the failure occurred, or both. The operator can at his discretion take action as a result of the failure mode. In certain circumstances, for example those pertaining to safety, a failure detected by the computer system 10 may cause the computer system 10 to abort or shutdown a test in progress without regard to any action taken by the operator.

With regard now to FIG. 7, an exemplary GUI 66 for viewing test results is shown. The test results GUI 66 may include an output selection panel 84, an output chart panel 86, and a ram displacement panel 88. The output selection panel 84 can include labels, input fields and output fields that allow an operator to select the test data to be viewed. The operator can have the option of viewing certain test results in real-time or requesting that past tests be displayed through the test results GUI 66. The operator may, for example, determine which measurement input channels to monitor by requesting the computer system 10 to plot particular channels on the output chart panel 86 of the test results GUI 66. Some typical plot selections may include, but are not limited to: Wheel Rate vs. Displacement; Wheel Rate vs. Time; Load vs. Time; and Displacement vs. Time. Of course, there may be several other plot selections available for a particular test without departing from the scope of the present invention. The output chart panel 86 may be capable of plotting particular input channels corresponding to each corner of the vehicle 20.

The ram displacement panel 88 may include labels, input fields and output fields corresponding to ram displacement demands. Relative compression and rebound displacement for each ram 22 may be monitored as well as absolute displacement. Moreover, an operator may be provided with the capability to control actuation of the rams 22. The computer system 10 may format vehicle suspension data and rig data for simultaneous display. The test results GUI 66 can then display both suspension data and rig data for simultaneous monitoring, thereby providing a simple, contained testing solution in a single, convenient interface. Thus, the computer system 10 provides real-time feedback of test results, ram displacement and other suspension parameters from the test results GUI 66, in addition to logging the measured data for later analysis or direct import into other vehicle analysis software.

By interacting with the computer system 10, an operator can perform a litany of tests pertaining to the chassis and suspension system of a test vehicle. All necessary components for conducting comprehensive vehicle suspension testing are contained in the test system 14 and are easily and readily manipulated and controlled through the one or more GUIs 34 at the computer system 10. The computer system 10 even permits the overlay of test data gathered from actual race track testing with the data obtained from the suspension testing to obtain a close correlation. Thus, engineers and race teams can obtain a representative comparison of suspension system performance characteristics that can be matched to real world conditions.

Figure 8A:
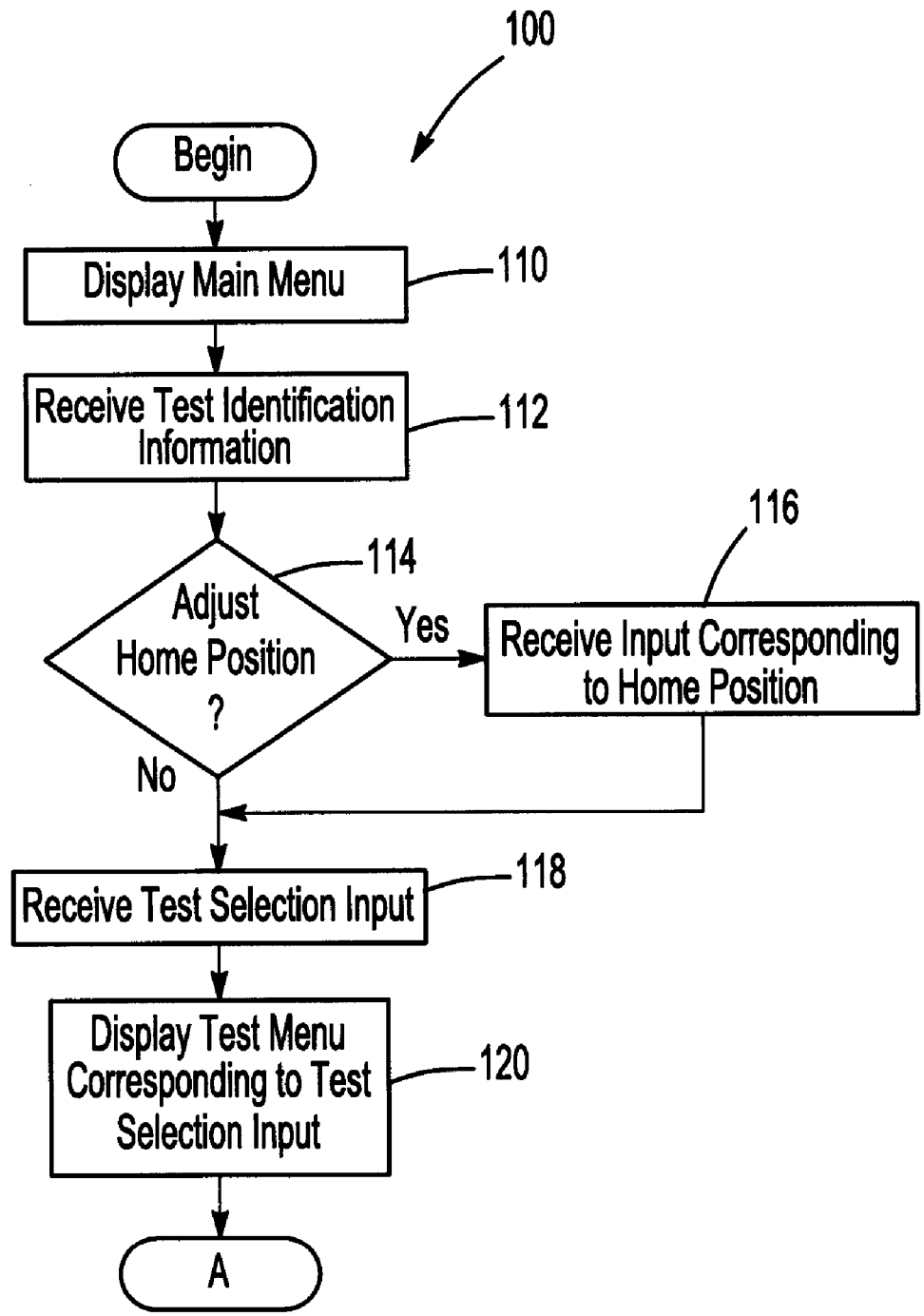
FIG. 8a depicts an operational flowchart demonstrating a main menu GUI according to one embodiment of the present invention.

FIG. 8a depicts an operational flowchart 100 demonstrating aspects of the main menu GUI 48. In block 110 of flowchart 100, the computer system 10 displays the main menu GUI 48 at the display 36. According to block 112, the computer system 10 may receives test identification information input at the test identification panel 50 of the main menu GUI 48.

Decision block 114 determines whether or not instructions for adjusting the "home" position of the vehicle 20 have been received. In at least one embodiment, this determination is made by receiving a corresponding input at the car position panel 52 of the main menu GUI 48. If the value obtained from decision block 114 is yes, then the computer system 10 may receive additional input at the car position panel 52 corresponding to the desired "home" position adjustment at block 116. If, on the other hand, the value obtained from decision block 114 is no, then the step at block 116 can be bypassed.

In block 118, the computer system 10 can receive test selection information input at the test selection panel 54 of the main menu GUI 48. At block 120, the computer system 10 can display a test menu GUI corresponding to the test selection input from block 118.

Figure 8B:
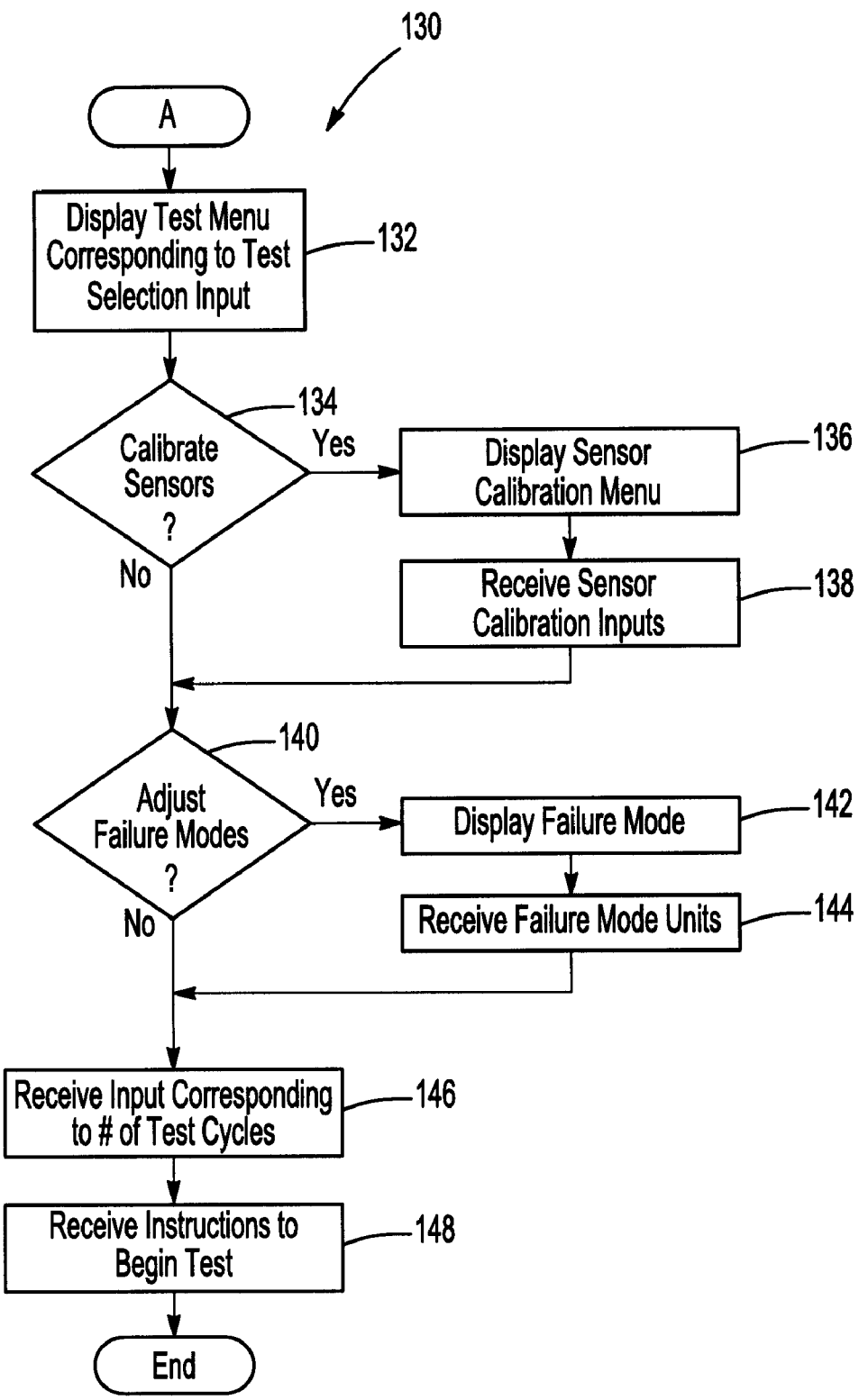
FIG. 8b depicts an operational flowchart demonstrating a test menu GUI according to one embodiment of the present invention.

FIG. 8b depicts an operational flowchart 130 demonstrating aspects of the test menu GUI 56 for the set-up of a selected test procedure. Flowchart 130 may begin at block 120 of FIG. 8a wherein the computer system 10 can display a test menu GUI corresponding to the test selection input from block 118. In decision block 134 of flowchart 130, the computer system 10 determines whether or not instructions for calibrating the one or more rig feedback sensors 44 or the one or more vehicle suspension sensors 46 have been received. If the value from decision block 134 is yes, then the computer system 10 can display the sensor calibration menu GUI 62 at block 136. At block 138, the computer system 10 can receive inputs corresponding to channel calibration information from the sensor calibration menu GUI 62. If the value from decision block 134 is no, then sensor calibration can be bypassed.

Decision block 140 determines whether or not instructions for adjusting failure mode limits have been received. If the value from decision block 140 is yes, then the computer system 10 can display the failure mode menu GUI 64 at block 142. At block 144, the computer system 10 can receive inputs corresponding to failure mode limits and other criteria from the failure mode menu GUI 64. If the value from decision block 140 is no, then failure mode adjustment is bypassed.

In block 146, the computer system 10 can receive input corresponding to the number of test cycles to be performed or duration of the test. According to block 148, the computer system 10 can receive input from the test menu GUI 56 corresponding to an instruction to begin a test. Action then ends.

Figure 9:
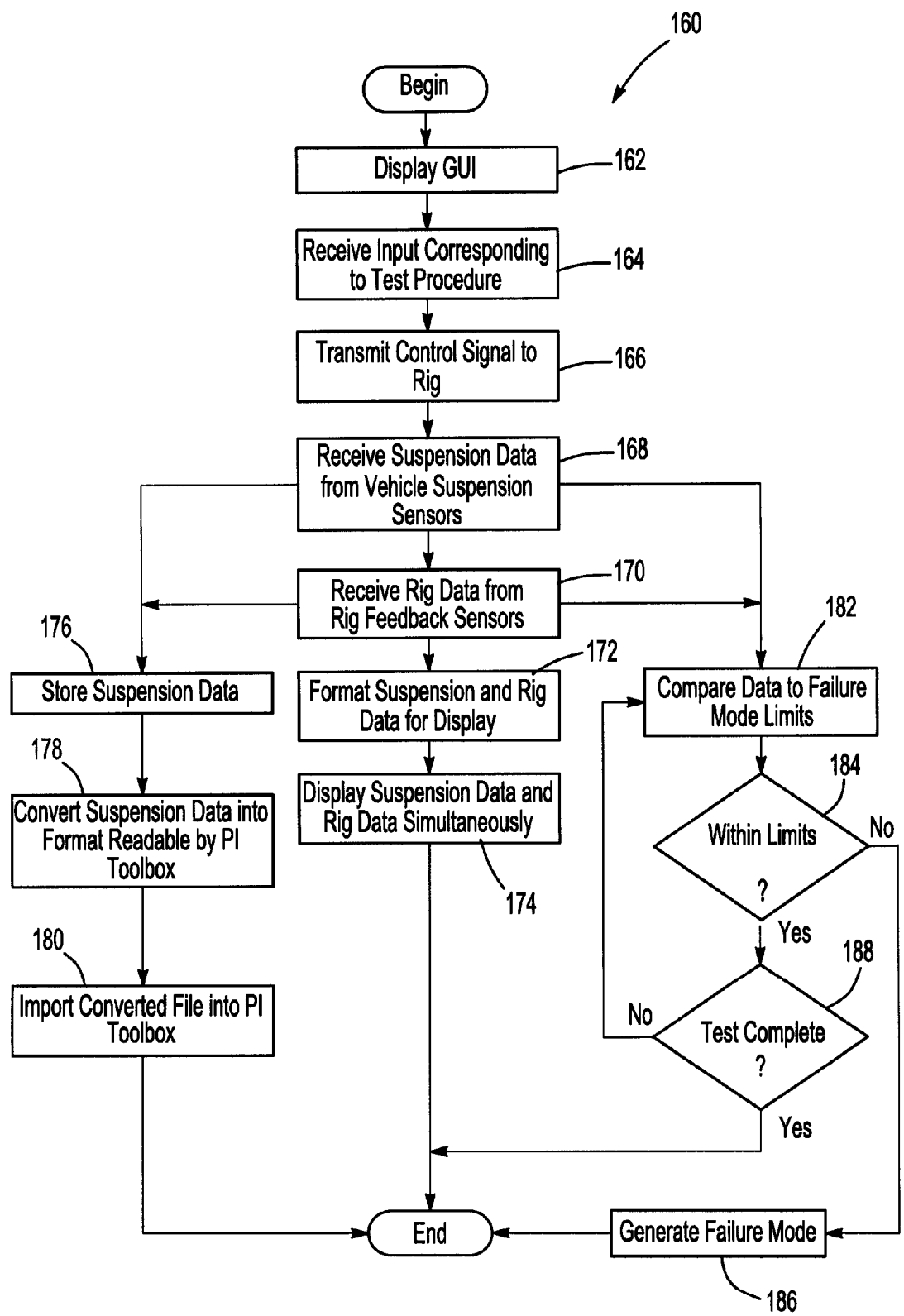
FIG. 9 depicts an operational flowchart of a method for testing a vehicle suspension.

FIG. 9 depicts an operational flowchart 160 of a method for testing a vehicle suspension. According to block 162, the computer system 10 displays a graphical user interface, for example, the test menu GUI 56. In block 164, the computer system 10 can receive input corresponding to a selected test procedure, for example, an instruction to begin the test procedure. In block 166, the computer system 10 may transmit control signals to the kinematics rig 12 for operating the rams 22.

According to block 168, the computer system 10 can receive vehicle suspension data from the one or more vehicle suspension sensors 46. Likewise, the computer system 10 can receive rig data from the one or more rig feedback sensors 44 at block 170. In block 172, the computer system 10 can format the suspension data and rig data for display, either in real-time or for subsequent viewing. In block 174, the computer system 10 can display the suspension data and rig data for simultaneous viewing at the display 36. Action then ends.

According to block 176, the computer system 10 can also record the suspension data and rig data and store in a file to be placed into memory or onto some suitable medium. In block 178, the computer system 10 can convert the stored data into a format readable by PI Toolbox. Then, in block 180, the computer system 10 may import the converted file into a PI Toolbox software program. Action then ends.

According to block 182, the computer system 10 can also compare the suspension data and the rig data to failure mode limits input at the failure mode menu GUI 64. Decision block 184 determines whether or not the data being compared is within the limits defined. If the value from decision block 184 is no, meaning that data has fallen outside the defined limits, then the computer system 10 may generate a corresponding failure mode at block 186. In at least one embodiment, action then ends. If the value from decision block 184 is yes, meaning that the data is within the specified limits, then the computer system 10 may determine whether or not the current test has been completed at decision block 188. If the value from decision block 188 is no, then the current test is still in progress and action loops back to block 182. If, however, the value from decision block 188 is yes, then the current test is complete and action then ends.

It should be noted that the method of FIG. 9 as described herein is exemplary only, and that the functions or steps of the method could be undertaken other than in the order described and/or simultaneously as may be desired, permitted and/or possible.

While the best mode for carrying out the invention has been described in detail, those familiar with the art to which this invention relates will recognize various alternative designs and embodiments for practicing the invention as defined by the following claims.

What is claimed:

1. A computer system for testing a vehicle suspension using a kinematics rig having one or more rig feedback sensors, the computer system comprising:
   a central processing unit (CPU) for executing machine instructions;
   a memory for storing machine instructions that are to be executed by the CPU; and
   a rig control circuit in electrical communication with the CPU for operating the kinematics rig and the one or more rig feedback sensors, wherein the machine instructions when executed by the CPU implement the following functions:

receiving an input corresponding to a pre-programmed test procedure for testing the vehicle suspension;

transmitting a control signal to the kinematics rig corresponding to the test procedure;

receiving suspension data sensed by one or more vehicle suspension sensors during execution of the test procedure;

receiving rig data sensed by the one or more rig feedback sensors during execution of the test procedure; and formatting the suspension data and rig data for display via a graphical user interface (GUI).

2. The computer system of claim 1, wherein the machine instructions when executed by the CPU further implement the following functions:

displaying the suspension data and rig data simultaneously on a display.

3. The computer system of claim 1, wherein the machine instructions when executed by the CPU further implement the following functions:

displaying a GUI having input fields for selective identification of a pre-programmed test procedure.

4. The computer system of claim 1, wherein the pre-programmed test procedure is a test procedure selected from the group consisting of static four corner position, cornering attitude, single wheel bump, single axle heave, full vehicle heave, full vehicle pitch, single axle roll, full vehicle roll and full vehicle warp.

5. The computer system of claim 1, wherein the suspension data and rig data are formatted for display in real-time.

6. The computer system of claim 1, wherein the pre-programmed test procedure is customizable.

7. The computer system of claim 1, wherein the machine instructions when executed by the CPU further implement the following functions:

comparing actual suspension data values sensed by the one or more vehicle suspension sensors with pre-set suspension value limits; and generating a failure mode if the actual suspension data values sensed falls outside the pre-set suspension value limit.

8. The computer system of claim 1, wherein the one ore more vehicle suspension sensors is a sensor selected from the group consisting of a linear displacement transducer, a load transducer and a geometrical alignment transducer.

9. The computer system of claim 1, wherein the rig control circuit is a hydraulic controller configured to operate four hydraulic rams of the kinematics rig, each hydraulic ram supporting the vehicle at one of its wheels.

10. The computer system of claim 9, wherein the one or more rig feedback sensors is a hydraulic pressure sensor.

11. The computer system of claim 1, wherein the machine instructions when executed by the CPU further implement the following functions:

storing the sensed suspension data into a flat file;

converting the sensed suspension data flat file into a format readable by PI Toolbox; and importing the converted file into PI Toolbox for data analysis.

12. A computer system for testing a vehicle suspension using a kinematics rig having one or more rams for supporting the vehicle at its wheels and having one or more rig feedback sensors, the computer system comprising:

a central processing unit (CPU) for executing machine instructions;

a memory for storing machine instructions that are to be executed by the CPU; and a rig control circuit in electrical communication with the CPU for operating the kinematics rig, wherein the machine instructions when executed by the CPU implement the following functions:

displaying a graphical user interface including one or more input fields, wherein the input fields correspond to at least one of a pre-programmed test procedure, starting position of the one or more rams, and displacement of the one or more rams;

receiving an input corresponding to the at least one of the pre-programmed test procedure, starting position of the one or more rams, and displacement of the one or more rams for testing the vehicle suspension;

transmitting a control signal to the kinematics rig corresponding to the at least one of the pre-programmed test procedure, starting position of the one or more rams, and displacement of the one or more rams;

receiving suspension data sensed by one or more vehicle suspension sensors during execution of the test procedure;

receiving rig data sensed by the one or more rig feedback sensors during execution of the test procedure; and formatting the suspension data and rig data for simultaneous display via a graphical user interface (GUI).

13. The computer system of claim 12, wherein the machine instructions when executed by the CPU further implement the following functions:

displaying the suspension data and rig data simultaneously on a display.

14. The computer system of claim 12, wherein the machine instructions when executed by the CPU further implement the following functions:

comparing actual suspension data values sensed by the one or more vehicle suspension sensors with pre-set suspension value limits; and generating a failure mode if the actual suspension data values sensed falls outside the pre-set suspension value limit.

15. The computer system of claim 12, wherein the one ore more vehicle suspension sensors is a sensor selected from the group consisting of a linear displacement transducer, a load transducer and a geometrical alignment transducer.

16. The computer system of claim 12, wherein the machine instructions when executed by the CPU further implement the following functions:

storing the sensed suspension data into a flat file;

converting the sensed suspension data flat file into a format readable by PI Toolbox; and importing the converted file into PI Toolbox for data analysis.

17. An electronic method for testing a vehicle suspension using a kinematics rig having one or more rig feedback sensors, the method comprising:

receiving an input corresponding to a pre-programmed test procedure for testing the vehicle suspension;

transmitting a control signal to the kinematics rig corresponding to the test procedure;

receiving suspension data sensed by one or more vehicle suspension sensors during execution of the test procedure;

receiving rig data sensed by the one or more rig feedback sensors during execution of the test procedure; and formatting the suspension data and rig data for simultaneous display via a graphical user interface (GUI).

18. The method of claim 17, further comprising:

displaying the suspension data and rig data simultaneously on a display.

19. The method of claim 17, further comprising:

displaying a GUI having input fields for selective identification of a pre-programmed test procedure.

20. The method of claim 17, further comprising:

storing the sensed suspension data into a flat file;

converting the sensed suspension data flat file into a format readable by PI Toolbox; and importing the converted file into PI Toolbox for data analysis.

* * * * *